No. 881,516. PATENTED MAR. 10, 1908.
J. A. WILLAREDT.
ANNULAR VALVE FOR COMPRESSORS, BLOWING ENGINES, AND THE LIKE.
APPLICATION FILED OCT. 12, 1907.

3 SHEETS—SHEET 1.

No. 881,516. PATENTED MAR. 10, 1908.
J. A. WILLAREDT.
ANNULAR VALVE FOR COMPRESSORS, BLOWING ENGINES, AND THE LIKE.
APPLICATION FILED OCT. 12, 1907.
3 SHEETS—SHEET 2.

No. 881,516. PATENTED MAR. 10, 1908.
J. A. WILLAREDT.
ANNULAR VALVE FOR COMPRESSORS, BLOWING ENGINES, AND THE LIKE.
APPLICATION FILED OCT. 12, 1907.

3 SHEETS—SHEET 3.

UNITED STATES PATENT OFFICE.

JEAN ALFRED WILLAREDT, OF BRUSSELS, BELGIUM.

ANNULAR VALVE FOR COMPRESSORS, BLOWING-ENGINES, AND THE LIKE.

No. 881,516.  Specification of Letters Patent.  Patented March 10, 1908.

Application filed October 12, 1907. Serial No. 397,145.

*To all whom it may concern:*

Be it known that I, JEAN ALFRED WILLAREDT, civil engineer, citizen of Switzerland, residing at 12 Avenue Du Midi, Brussels, Belgium, have invented certain new and useful Improvements in Annular Valves for Compressors, Blowing-Engines, and the Like; and I do hereby declare the following to be a full, clear, and exact description of the invention, such as will enable others skilled in the art to which it appertains to make and use the same.

For the proper working of compressors, blowing engines and the like, the construction of the valves is of greatest importance. The operation of the valves is only free from objection when they are satisfactorily guided and move with as little friction as possible in their guides. The known valves generally slide in separate, somewhat large guides, so that loss arises from friction. Moreover, the sliding surfaces become dirty and affect the free movement of the valves, so that the efficiency of the engine is much impaired.

The present invention relates to an annular valve completely free from friction and satisfactorily guided. The valve plate or ring is guided by a blade spring loading the valve.

Figure 1:
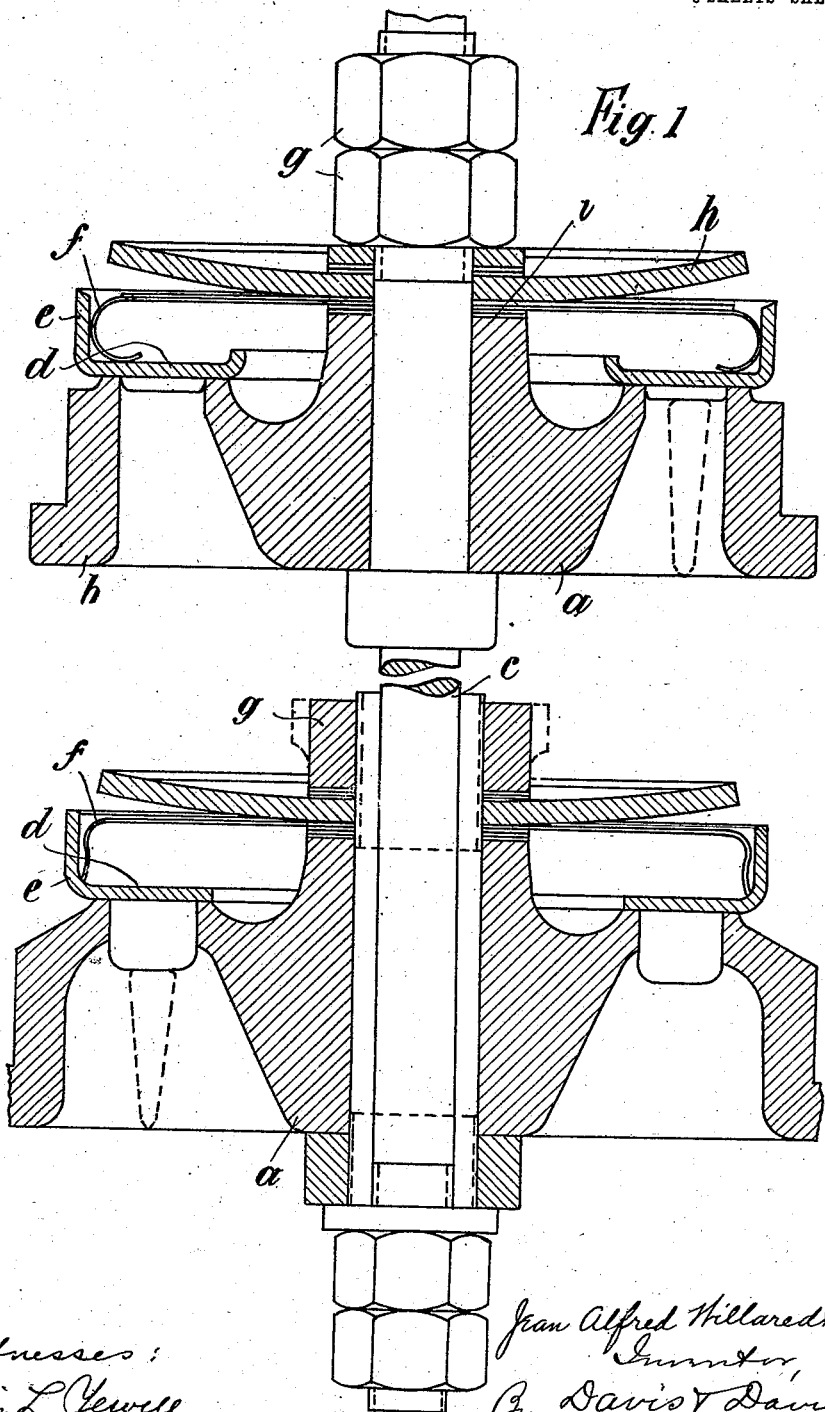
Figure 2:
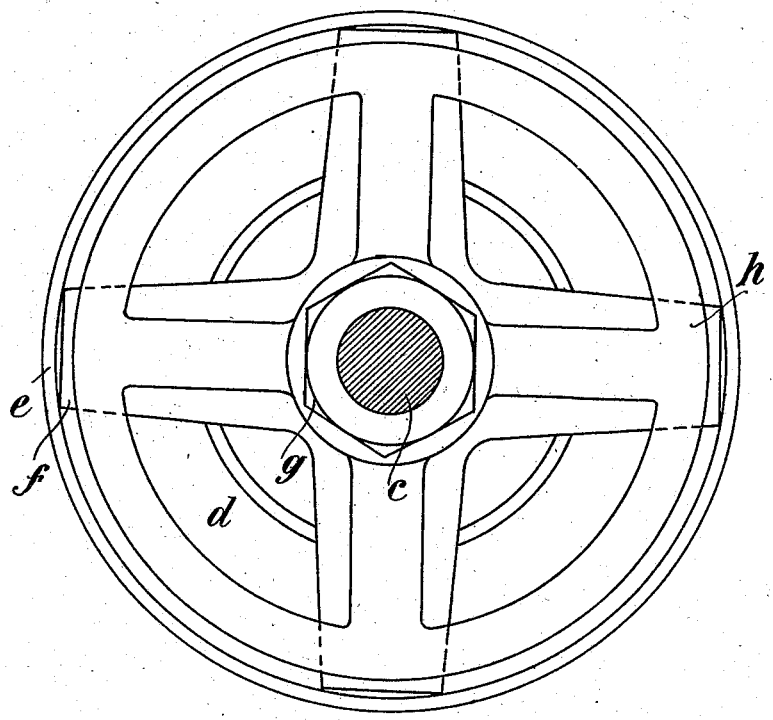
Figure 3:
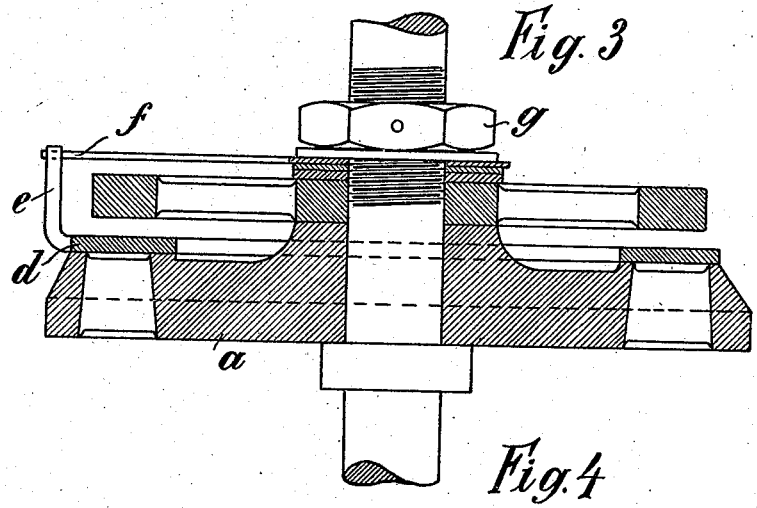
Figure 4:
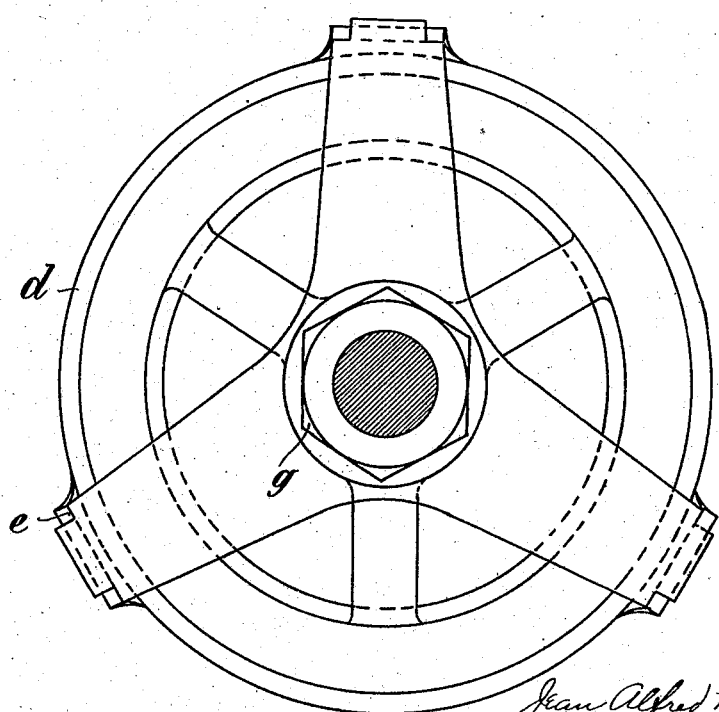

In the accompanying drawings, Figure 1 is a longitudinal section and Fig. 2 a plan of one form of in-take and outlet valve constructed according to the invention, and Figs. 3 and 4 are like views respectively of a modification.

$a$ is the seat for the intake valve and $b$ that for the outlet valve. The two valve seats have annular passages and are mounted on a spindle $c$ by means of which the valves are fixed in the valve chamber. The annular passages through the valve seats $a$ and $b$ are closed by valve rings $d$ which are turned upwardly at their outer edges $e$. The valves are loaded by two blade springs $f$ crossing each other at right angles or a single star-shaped blade spring. Screw nuts $g$ hold the springs or spring in position. The spring or springs form a good guide for the ring $d$, and for this purpose the ends of the spring are curved and lie against the inner face of the turned up edge $e$ of the ring. A stop-plate $h$ threaded on the spindle $c$ and held by the nut $g$ limits the stroke of the valve by limiting the curvature of the springs, and this plate is curved to correspond with the curvature assumed by the springs when the valve lifts, thus aiding the guiding action of the springs.

The tension of the loading springs can be varied by exchanging for others the washers $i$ between the springs and the valve seating. Thus the valve can be used for different pressures of blast. The turned up edge of the ring $d$ is also advantageous in that pieces do not get knocked out of the edge of the ring, which could otherwise easily happen as a result of the rapidly repeated blows of the ring upon its seat. To the same end the inner edge of the ring $d$ may be bent upwards. A special advantage of the new valve over the known valves having no guides, is that it is suitable both for vertical and horizontal positions.

In the modification shown in Figs. 3 and 4 the edge of the ring $d$ is not turned up all round the ring but only at three places $e$. The three-armed spring engages in recesses in the turned up portions. The stop-plate is in this case between the valve ring and the spring.

It will be observed that the valve plate has no other guides than is afforded by the ends of the radial springs so that when the valve is open the plate practically floats, being free to move toward and away from its seat without any appreciable sliding action on the ends of the springs. In order to normally press the valve plate against its seat and also to center it, it will be observed that the free ends of the springs must not only impinge against a part of the plate facing inwardly toward the stem but must also press against an upwardly-facing part of the plate. It will be observed also that by making the plate separate from the springs the plate may be made of sufficient thickness and weight and diameter to withstand the severe hammering valves of this type are subjected to in use, while on the other hand the springs may be more readily given the proper strength and tension and may also be separately removed would they break.

Having now particularly described and ascertained the nature of my said invention and in what manner the same is to be performed, I declare that what I claim is:—

1. In a valve, the combination of a central stem or rod, an annular seat thereon, an annular plate on said seat having at its outer annular edge inwardly and upwardly facing parts, a series of radial springs fastened to the stem and having their outer ends shaped to fit against said inwardly and upwardly facing parts of the valve plate, to center the plate and also to normally hold it against its seat.

2. In a valve, the combination of a central stem or rod, an annular seat thereon, an annular plate on said seat having at its outer annular edge inwardly and upwardly facing parts, a series of radial springs fastened to the stem and having their outer ends shaped to fit against said inwardly and upwardly facing parts of the valve plate, to center the plate and also to normally hold it against its seat, a circular stop on the stem to limit the upward movement of the springs and the plate, and means for removably clamping the stop and the springs in place on the stem.

In testimony whereof I hereunto affix my signature in the presence of two witnesses.

JEAN ALFRED WILLAREDT.

Witnesses:
 GREGORY PHELAN,
 PAUL MAFTY.